US009992185B1

(12) United States Patent
Basha P.R. et al.

(10) Patent No.: US 9,992,185 B1
(45) Date of Patent: *Jun. 5, 2018

(54) VIRTUAL DESKTOP ACCELERATOR SUPPORT FOR NETWORK GATEWAY

(71) Applicant: WYSE TECHNOLOGY INC., San Jose, CA (US)

(72) Inventors: Khader Basha P.R., Karnataka (IN); Santhosh Krishnamurthy, Karnataka (IN); Manish Bhaskar, San Jose, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 523 days.

This patent is subject to a terminal disclaimer.

(21) Appl. No.: 13/668,178

(22) Filed: Nov. 2, 2012

(51) Int. Cl.
*H04L 29/06* (2006.01)

(52) U.S. Cl.
CPC .......... *H04L 63/0807* (2013.01); *H04L 29/06* (2013.01)

(58) Field of Classification Search
None
See application file for complete search history.

(56) References Cited

U.S. PATENT DOCUMENTS

| | | | | |
|---|---|---|---|---|
| 6,161,123 A * | 12/2000 | Renouard | ............... | H04L 29/06 709/203 |
| 7,925,694 B2 | 4/2011 | Harris | ........................... | 709/203 |
| 8,010,630 B2 * | 8/2011 | Barreto | ............. | H04L 29/08846 709/219 |
| 8,051,180 B2 * | 11/2011 | Mazzaferri | ........... | G06F 3/1415 709/227 |
| 8,117,314 B2 | 2/2012 | Croft et al. | .................... | 709/227 |
| 8,370,856 B2 | 2/2013 | Peterson | ....................... | 719/320 |
| 8,387,130 B2 | 2/2013 | Love et al. | ..................... | 726/15 |
| 8,549,596 B2 | 10/2013 | Innes | ................. | 726/7 |
| 8,681,813 B2 | 3/2014 | Basha et al. | | |
| 8,725,880 B2 | 5/2014 | Santamaria et al. | .......... | 709/227 |
| 8,775,658 B2 | 7/2014 | Kasivajhula et al. | | |
| 8,843,750 B1 | 9/2014 | Sokolov | ........................ | 713/175 |
| 2002/0152311 A1 | 10/2002 | Veltman et al. | ............. | 709/227 |
| 2002/0176427 A1 | 11/2002 | Noda | ............................ | 370/401 |
| 2004/0068668 A1 | 4/2004 | Lor | ................................. | 726/15 |
| 2004/0143629 A1 | 7/2004 | Bodin | .......................... | 709/205 |
| 2004/0153537 A1 | 8/2004 | Rezvani | ........................ | 709/223 |
| 2004/0158639 A1 | 8/2004 | Takusagawa | ................. | 709/229 |

(Continued)

OTHER PUBLICATIONS

Khare et al., "Upgrading to TLS Within HTTP/1.1", Network Working Group Request for Comment: RFC 2817, p. 1-13, May 1, 2000.

*Primary Examiner* — Trang Doan
(74) *Attorney, Agent, or Firm* — Baker Botts L.L.P.

(57) ABSTRACT

The subject disclosure relates to a method for initiating an accelerated desktop session between a client device and a remote server. In some aspects, the method includes steps for receiving, via a network gateway, a remote desktop connection request, initiating a first connection with a client device via the network gateway using a first communication protocol and sending a token to the client device via the network gateway. In certain aspects, the method further comprises initiating a second connection with the client device, via a proxy, wherein the second connection is established using a second communication protocol. A client device and computer-readable medium are also provided.

18 Claims, 12 Drawing Sheets

(56) References Cited

U.S. PATENT DOCUMENTS

| | | | |
|---|---|---|---|
| 2004/0243703 A1 | 12/2004 | Demmer | 709/224 |
| 2005/0114711 A1 | 5/2005 | Hesselink et al. | 713/201 |
| 2005/0138144 A1 | 6/2005 | Sethi | 709/219 |
| 2006/0031407 A1 | 2/2006 | Dispensa et al. | 709/219 |
| 2006/0037072 A1 | 2/2006 | Rao et al. | 726/14 |
| 2006/0064750 A1* | 3/2006 | Kersey | H04L 63/0428 726/14 |
| 2008/0240091 A1* | 10/2008 | Kesavan | H04L 65/1053 370/389 |
| 2008/0282081 A1* | 11/2008 | Patiejunas | H04L 9/3273 713/153 |
| 2009/0109925 A1 | 4/2009 | Nakamura | 370/331 |
| 2009/0150988 A1 | 6/2009 | Love et al. | 726/10 |
| 2009/0216975 A1 | 8/2009 | Halperin et al. | 711/162 |
| 2009/0235342 A1* | 9/2009 | Manion | H04L 63/08 726/7 |
| 2009/0287837 A1 | 11/2009 | Felsher | 709/229 |
| 2009/0307311 A1 | 12/2009 | Fusari | 709/203 |
| 2010/0121959 A1 | 5/2010 | Lin et al. | 709/228 |
| 2010/0246602 A1* | 9/2010 | Barreto | H04L 49/90 370/466 |
| 2010/0250767 A1 | 9/2010 | Barreto et al. | 709/231 |
| 2010/0250770 A1* | 9/2010 | Barreto | H04L 49/90 709/231 |
| 2011/0016306 A1 | 1/2011 | Yoshidome | 713/150 |
| 2011/0113247 A1 | 5/2011 | Panasyuk et al. | 713/168 |
| 2011/0113344 A1 | 5/2011 | Hsueh | 715/740 |
| 2011/0154465 A1 | 6/2011 | Kuzin et al. | 726/9 |
| 2011/0185068 A1* | 7/2011 | Schmieder | H04L 69/16 709/227 |
| 2011/0219122 A1* | 9/2011 | Mahajan | G06F 15/16 709/227 |
| 2011/0231663 A1 | 9/2011 | Li et al. | 713/176 |
| 2011/0270991 A1 | 11/2011 | Zawacki et al. | 709/227 |
| 2012/0059955 A1 | 3/2012 | Anbarasu | 710/15 |
| 2012/0078751 A1 | 3/2012 | MacPhail et al. | 705/26.41 |
| 2012/0084570 A1 | 4/2012 | Kuzin et al. | 713/182 |
| 2012/0331300 A1* | 12/2012 | Das | H04L 69/164 713/176 |
| 2013/0036192 A1* | 2/2013 | Fausak | H04L 67/42 709/217 |
| 2013/0046852 A1* | 2/2013 | Saxena | H04L 67/08 709/217 |
| 2013/0067100 A1 | 3/2013 | Kuzin et al. | 709/228 |
| 2013/0166629 A1* | 6/2013 | Ivashin | H04L 63/10 709/203 |
| 2013/0263238 A1 | 10/2013 | Bidare | 726/7 |
| 2013/0290551 A1* | 10/2013 | Yang | H04L 12/2803 709/228 |
| 2014/0007188 A1 | 1/2014 | Innes | 726/2 |
| 2014/0007212 A1 | 1/2014 | Innes | 726/7 |

* cited by examiner

VIRTUAL DESKTOP ACCELERATOR SUPPORT FOR NETWORK GATEWAY

FIELD

The disclosure generally relates to a system and method for facilitating a remote connection between clients and servers, and particularly for facilitating an accelerated remote desktop session between a virtual desktop client and a virtual desktop server.

BACKGROUND

Some remote desktop sessions must utilize a network gateway, such as Microsoft Terminal Server Gateway (TSGW), for establishing a connection between a client device and a server within a private network. In some connection methods, a client device in a public network (e.g., the Internet) will first connect with a network gateway (e.g., the TSGW) before communicating with the server inside the private network. Once a connection is established between the client and the server (e.g., via the TSGW), communication between the client and the server is limited to network protocols supported by the TSGW.

SUMMARY

In certain aspects, the subject technology relates to a machine-readable medium encoded with instructions executable to perform a method, the method comprising, receiving, via a network gateway, a remote desktop connection request, establishing a first connection with a client device via the network gateway using a first communication protocol, sending a token to the client device via the network gateway, and establishing a second connection with the client device, via a proxy, wherein the second connection is established using a second communication protocol.

In yet another aspect, the subject technology relates to a server configured to establish a remote connection with a client device, the server comprising, one or more processors and a computer-readable medium comprising instructions stored therein, which when executed by the processors, cause the processors to perform operations comprising, receiving, via a network gateway, a remote desktop connection request and establishing a first connection with a client device via the network gateway using a first communication protocol. In certain implementations, the processors can be further configured to perform operations for sending a token to the client device via the network gateway and establishing a second connection with the client device, via a proxy, wherein the second connection is established using a second communication protocol.

In yet another aspect, the subject technology relates to a computer-implemented method for establishing a remote connection with a client device, the method comprising, receiving, via a network gateway, a remote desktop connection request and establishing a first connection with a client device via the network gateway using a first communication protocol. In certain aspects, the method may further include steps for sending a token to the client device via the network gateway and establishing a second connection with the client device, via a proxy, wherein the second connection is established using a second communication protocol.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

DETAILED DESCRIPTION

Figure 1:
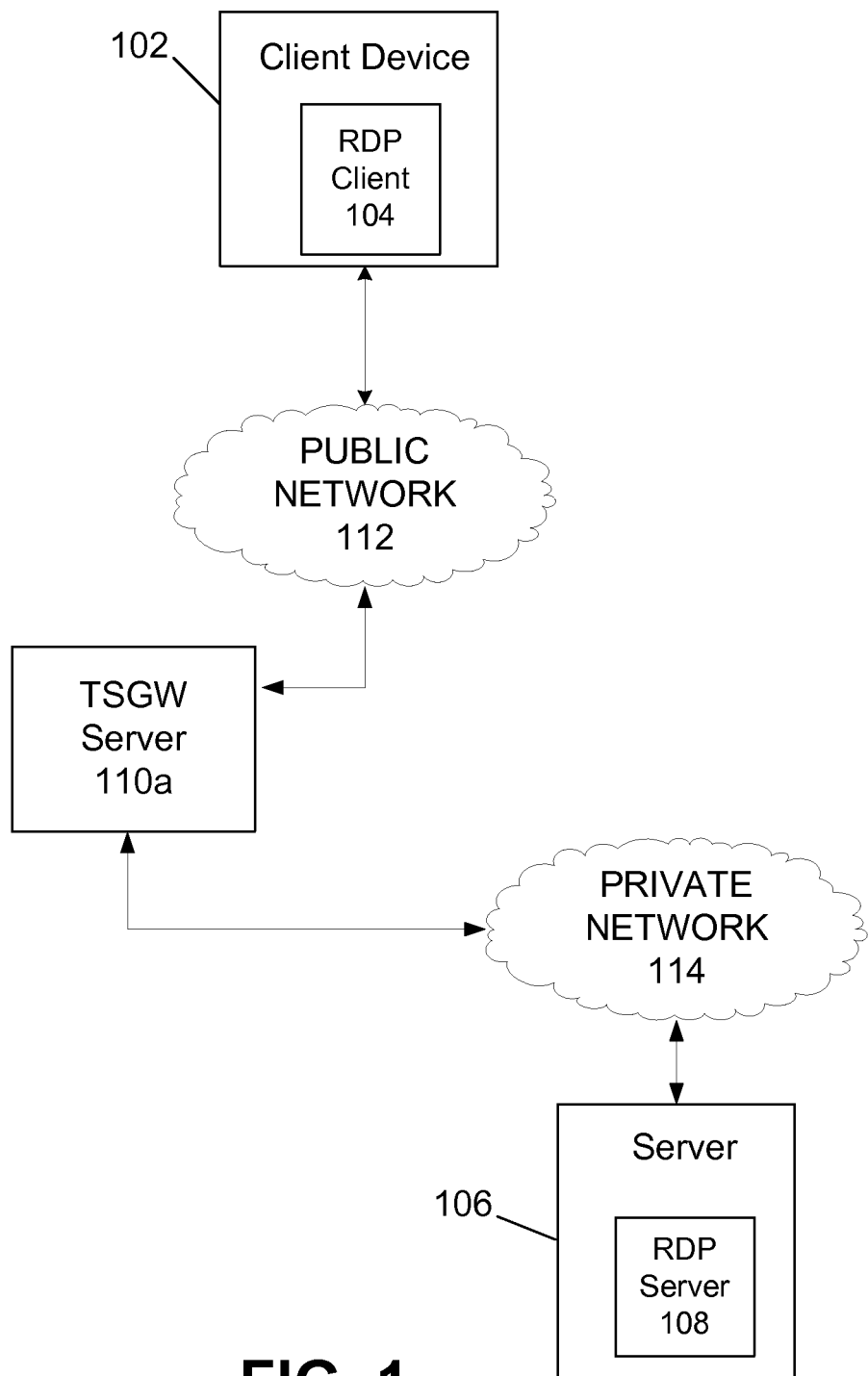
FIG. 1 is a block diagram illustrating an example of a network system.

The detailed description set forth below is intended as a description of various configurations of the subject technology and is not intended to represent the only configurations in which the subject technology may be practiced. The appended drawings are incorporated herein, and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In some remote desktop connection methods, the network gateway (e.g., a TSGW) is limited to use of a transmission control protocol (TCP) for transporting data using a remote desktop protocol (RDP), to provide communication between a client device and a remote server. For example, RDP can be used in client/server applications to provide a user (e.g., a user of a client device) access to a remote server using a graphical interface showing a desktop environment of a user session running on the remote server. However, for environments in which communication between the client device and the server is constrained by bandwidth limitations, network delay and/or packet loss, use of TCP to transport RDP may limit data throughput. In order to improve data transport performance, enhanced communication protocols, such as UDP Plus, can be implemented. Aspects of UDP Plus are detailed in U.S. patent application Ser. No. 12/484,126, entitled, "APPARATUS AND METHOD FOR TRANSPARENT COMMUNICATION ARCHITECTURE IN REMOTE COMMUNICATION," filed Jun. 12, 2009, which is incorporated herein by reference. Additionally, aspects of the use of UDP Plus for bandwidth optimization are described in U.S. patent application Ser. No. 13/306,804, entitled, "BANDWIDTH OPTIMIZATION FOR REMOTE DESKTOP PROTOCOL," filed Nov. 29, 2011, which is also incorporated herein by reference.

It is common for users to wish to establish remote desktop sessions between a client device on a public network (e.g., the Internet) and a desktop/server in a private network, for example, a private LAN or WAN. To establish a remote desktop connection with the server, it is usually necessary for the client to first connect with a network gateway that bridges a communication path between the public network and the private network. Depending on implementation, the network gateway can provide several types of functionality. For example, the network gateway can be configured to authenticate the client device and route traffic received from the client device to the target server within the private network.

A limitation of some remote desktop connection methods (which utilize a network gateway) is that communication between the client device and the server is limited to protocols supported by the network gateway. By way of example, network gateways commonly utilize a terminal services gateway service (e.g., a TSGW server) for use in authenticating the client device and mapping the remote desktop session initiated by the client device to the intended desktop/server in a private network. In some implementations, the server is configured to establish a remote desktop session using a remote desktop protocol server module (e.g., a RDP server). As such, the TSGW server of the network gateway is commonly configured to support remote desktop sessions using remote desktop protocol (RDP), and to support TCP for transporting RDP.

Although TCP is compatible with the TSGW server, other protocols may not be supported. Thus, in many network configurations, remote desktop sessions between a client device and a server in the private network are limited to use of whatever protocols are supported by the network gateway, such as TCP. It is desirable to have the option to use other communication protocols that are capable of providing an enhanced user experience, without the need to make significant changes to existing hardware and/or software security measures.

The subject disclosure provides methods, including software and hardware solutions, to address the foregoing need. Specifically, the subject technology provides methods and systems that can be implemented with respect to a client device, a server and a network gateway that will enable a connection between the client and the server using a proprietary communication protocol. As will be described in further detail below, the subject technology can enable a client device to establish a first connection with a server in a private network using a first communication protocol, such as TCP, and to then break the first connection and establish a second connection with the server using a second communication protocol. In certain aspects, the second communication protocol will comprise a proprietary communication protocol (such as UDP Plus) that can be used to transport RDP data between a client device and a server, for example, to establish a remote desktop session with improved bandwidth optimization.

As mentioned above, in some methods a remote desktop session can be established between a client and a server over a network gateway (e.g., a network gateway supporting a TSGW server). An example of a remote desktop connection is depicted in FIG. 1. Specifically, FIG. 1 illustrates an example of a network system 100 according to some implementations. As illustrated, network system 100 includes client device 102 (including a RDP client 104), server 106 (including a RDP server 108), network gateway 110 (including a TSGW server 110a), public network 112 and private network 114.

In certain aspects, "RDP client" and "RDP server" may refer to software modules or applications that are stored on and/or executed by distinct computing devices, such as client device 102 and server 106, respectively. Furthermore, in some aspects, "network gateway" may refer to a computing device (e.g., network gateway 110) that is configured to bridge a connection between two computer networks, such as public network 112 and private network 114. Furthermore, the "TSGW server" (e.g., TSGW server 110a) may comprise a software module that resides on network gateway 110.

In the network system 100, client device 102 is connected to network gateway 110 via public network 112. In turn, network gateway 110 is connected to server 106 via private network 114. Client device 102 (using RDP client 104), may communicate with RDP server 108, via network gateway 110.

Public network 112 may include a variety of different network types, including, but not limited to, wired or wireless networks (e.g., a LAN or WAN), or a network of networks, such as the Internet. As illustrated, network gateway 110 provides an interface between public network 112 and a private network or domain, such as private network 114. A user of client device 102 can use RDP client 104 to establish a remote desktop session with RDP server 108 residing on server 106.

By way of example, the client device 102 may connect with the network gateway 110 via the public network 112. The network gateway 110 may then authenticate the client device (e.g., using TSGW server 110a) and may forward communications from the client device 102 to RDP server 108 (e.g., via private network 114).

In the configuration illustrated in the network system 100, a remote desktop session between client device 102 and server 106 is limited by the communication protocols (e.g., TCP) that are supported by network gateway 110 (e.g., by the TSGW server 110a). In some examples, the TSGW server 110a will be limited to TCP for the transport of RDP. Such limitations may restrict the quality (e.g., throughput) of a remote desktop session between client device 102 and server 106.

To address this problem, aspects of the subject technology provide a way for a client device (e.g., client device 102) to establish a first connection with a server (e.g., server 106) using a first communication protocol, and to then establish a second connection with the server using a second communication protocol. More specifically, the subject technology provides methods and systems for establishing a first connection via a TSGW server of a network gateway (using the first communication protocol), and then establishing a second connection via a proxy of the network gateway (using a VDA proxy).

Figure 2A:
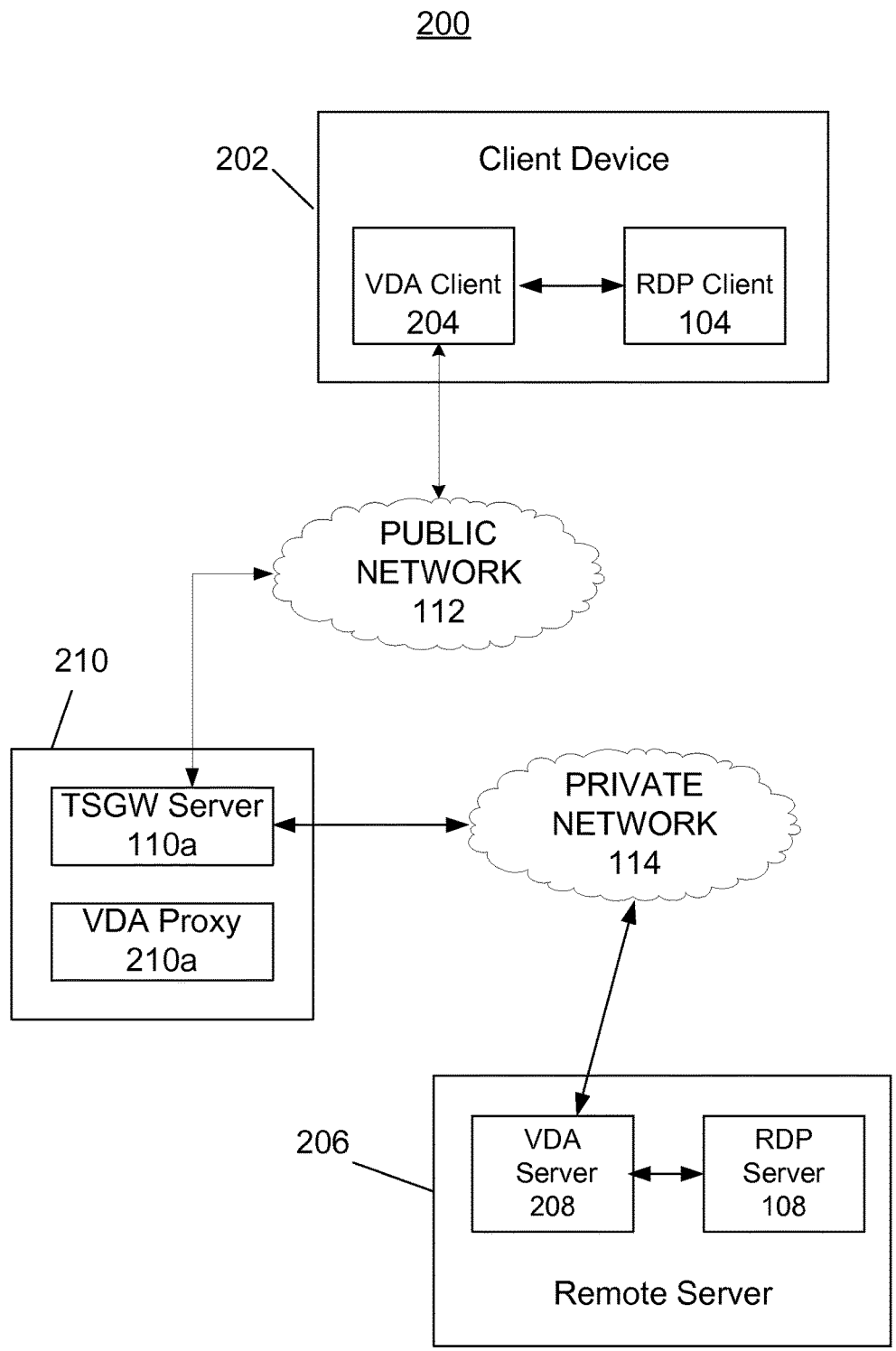
FIG. 2A illustrates an example of a network system with which certain aspects of the subject technology can be implemented.

FIG. 2A illustrates a network system 200 that may be used to implement certain aspects of the subject technology. The network 200 includes client device 202, which includes VDA client 204 and RDP client 104. The network system 200 also includes remote server 206, which includes VDA server 208 and RDP server 108. Additionally, network system 200 includes a network gateway that includes both VDA proxy 210a and TSGW server 110a. In the example of FIG. 2A, client device 202 is connected to network gateway 210 via public network 112 (e.g., the Internet). In turn, network gateway 210 is connected to remote server 206 via private network 114.

In certain implementations, VDA client 204 and RDP client 104 comprise software modules and/or applications that can be executed on client device 202. Similarly, VDA server 208 and RDP server 108 comprise software modules and/or applications that are stored on, and executed by remote server 206.

The client device 202 can establish a first connection with remote server 206 via public network 112 and network gateway 210 using a first communication protocol (e.g., TCP). For example, a user providing input to the client device 202 can initiate a remote desktop connection with remote server 206, e.g., by causing the RDP client 104 to initiate a remote desktop session. Subsequently, the remote desktop session initiated by RDP client 104 will be intercepted and managed by VDA client 204. The VDA client 204 can then perform steps for establishing the first connection with the remote server 205. Specifically, VDA client 204 can connect with the TSGW server 110a of network gateway 110. After a connection between client device 202 and network gateway 210 is established (e.g., using VDA client 204 and the TSGW server 110a), the network gateway 210 will perform a first authentication with respect to client device 202.

Authentication between the client device 202 and the TSGW server 110 of the network gateway 210 can be performed using any authentication technique. For example, a user of the client device 202 can be prompted to provide identification and authentication information. Alternatively, client device 202 may be authenticated using a token or a key. In certain aspects, a first authentication client device 202 will enable the proxy to add an entry into an entry table, for example, so that the proxy can perform data forwarding for data transmitted between the client and the server.

After the client device has been authenticated, a connection between the client device 202 and the remote server 206 may be established via private network 114. In certain aspects, the first connection with remote server 206 may be directed to VDA server 208 by VDA client 204, for example, using an IP address and port provided by the TSGW server. On the server side, the VDA server 208 may independently connect to RDP server 108.

The remote server 206 (e.g., using VDA server 208) may provide a token including a signature to the VDA client 204 for use in authenticating the client device 202 with remote server 206. The token may be passed from VDA server 208 to VDA client 204, via VDA proxy 210a. However, VDA proxy 210a may not decrypt or validate the signature of the token for purposes of authenticating VDA client 204.

The token may be used by VDA client 204 to perform authentication with remote server 206, in order to establish a second connection. For example, the signature received by VDA client 204 may be encrypted (for example, using SSL keys), wherein decryption keys needed to decrypt the signature will be maintained with VDA server 208. In order to authenticate VDA client 204, the encrypted signature will be sent from VDA client 204 to VDA server 208 via VDA proxy 210a, and decrypted by VDA server 208. If the signature is properly validated with the VDA server 208, the validation will be confirmed with VDA proxy 210a and a second connection will be established between VDA client 204 and VDA server 208.

Once VDA client 204 has been properly authenticated using the token and a second connection is successfully established, the first connection may be closed and a second connection may be initiated. The second connection can be initiated between client device 202 and remote server 206 via network gateway 210 (e.g., VDA proxy 210a) using a second communication protocol that is different from the first communication protocol. Although the second communication protocol may comprise any communication protocol suitable for supporting a remote desktop session, in some implementations the second communication protocol may comprise a proprietary protocol, such as UDP Plus.

Figure 2B:
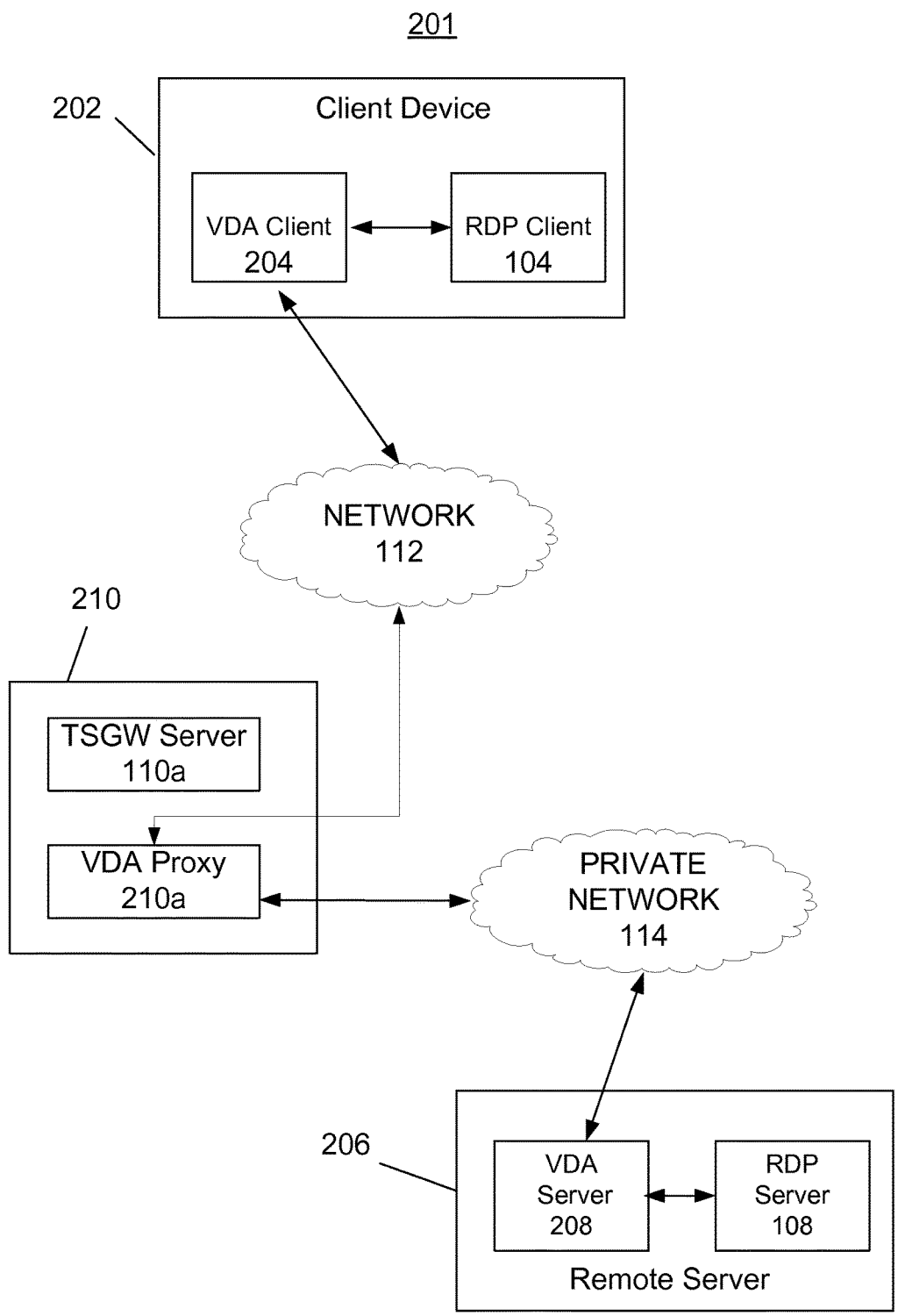
FIG. 2B illustrates the network system similar to that of FIG. 2A, wherein an accelerated remote desktop connection has been initiated, according to certain aspects of the subject disclosure.

An example of the second connection formed between client 202 and remote server 206 is illustrated in the block diagram of FIG. 2B. As illustrated, client device 202 communicates with remote server 206 via VDA proxy 210a of network gateway 210. More specifically, VDA client 204 of client device 202 communicates with VDA server 208 of remote server 206 using a second communication protocol (i.e., an "accelerated" protocol such as UDP Plus).

Figure 3A:
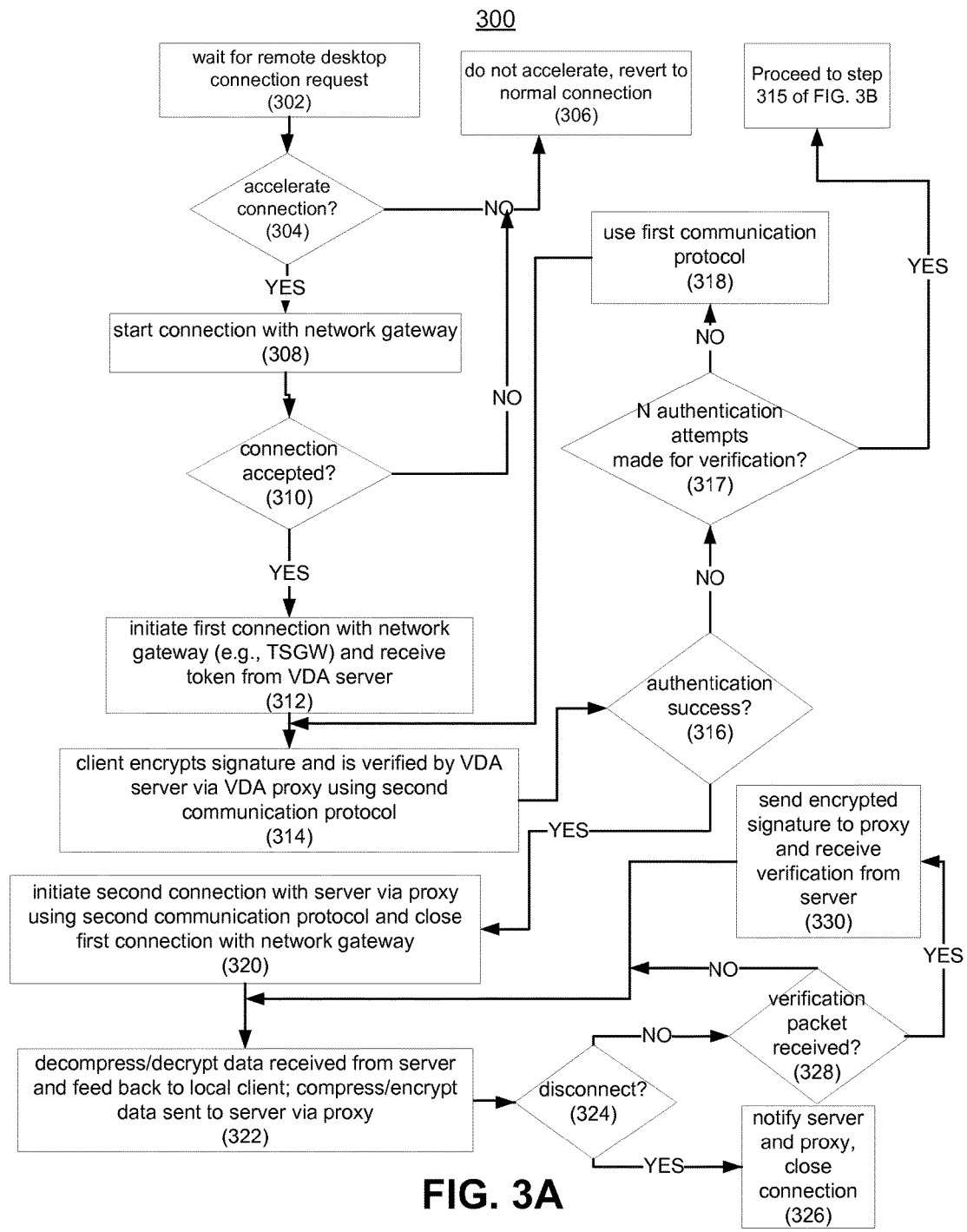
FIGS. 3A and 3B illustrate examples of processes for establishing an accelerated remote desktop connection using a client device, according to certain aspects of the disclosure.

The process of establishing an accelerated remote desktop connection, e.g., between client device 202 and remote server 206, is illustrated in further detail with respect to FIG. 3A. Specifically, FIG. 3A illustrates an example of a flow diagram 300 of steps for establishing an accelerated remote desktop connection using a second communication protocol, such as UDP Plus, to transport RDP data between a client device and a server.

The flow diagram 300 begins with step 302 in which the client (e.g., the VDA client 204) waits for a connection request, for example, coming from an RDP client (e.g., RDP client 104) of the client device. VDA client 204 may then intercept the connection request (e.g., the RDP connection request initiated by RDP client 104).

Subsequently, the process proceeds to step 304, wherein a determination is made as to whether the remote desktop session is to be accelerated (e.g., using an accelerated communication protocol, such as UDP Plus). The determination of whether or not to accelerate the remote desktop session can be made based on a variety of criteria. For example, in some implementations, the determination to accelerate the desktop connection will be based on input received from a user. Alternatively, the determination may be based on network latency and/or the availability of a VDA server with which to accelerate the session. If for any reason the determination is made not to accelerate the remote desktop session, the process proceeds to step 306 wherein the remote desktop session is not accelerated, and is established and maintained using a first communication protocol, such as TCP.

Alternatively, if the determination is made to accelerate the remote desktop session, the process proceeds to step 308, wherein an accelerated connection request is made to the network gateway. As described above, the network gateway can include a TSGW sever (e.g., TSGW server 110a) and a proxy (e.g., VDA proxy 210a).

Next, the process proceeds to step 310 where it is determined if the accelerated connection request is accepted by the network gateway. If not, the process loops back to step 306, wherein the connection is not accelerated and a connection is established, and maintained, using a standard protocol, such as TCP.

However, if the accelerated connection request is accepted by the network gateway in step 310, the process proceeds to step 312 in which a first connection is initiated with the server (e.g., via the TSGW server of the network gateway). By way of example, the TSGW server may facilitate a connection from the client device to the server by mapping a connection request of the client device to the proper VDA server IP address and port. Once the first connection between the client device and the server is initiated, a secure tunnel between the TSGW server and the client device (e.g., the VDA client of the client device) is established, for example, using a TSGW SSL certificate.

The client device and the server can then perform a "handshake" within the secure tunnel. The handshake allows the VDA server and VDA client to exchange protocol data unit (PDU) formatting information, for example, so that each device can learn how to append and remove data from packets transacted with the other device. Once the handshake is complete, the first connection may be established between the client device (e.g., the VDA client) and the server (e.g., the VDA server).

Subsequently, the client device will receive a token from the server. The token can include various types of information, such as a signature for use in authenticating the client device.

In step 314, the token is used to perform a second authentication with respect to the client device. As mentioned above, the token can be used to authenticate (validate) the client device with the proxy (e.g., the VDA proxy 210a). In some implementations, the token may be used to authenticate the client device directly with the server. In certain aspects, to avoid security compromise of the token, the VDA client may encrypt the signature before sending the signature to the VDA server via the VDA proxy. For example, the token may be encrypted using open SSL keys provided by the VDA server. After successfully decrypting and validating the signature, the VDA server can then provide an indication to the VDA proxy as to whether or not the VDA client was properly authenticated.

In step 316, it is determined if the token was properly validated (authenticated) with the server. If the token cannot be properly authenticated, the process proceeds to step 317, in which it is determined whether a predetermined number of authentication attempts have been made, for example, 'N' authentication attempts, where N represents a predefined value. If a predetermined number of authentication attempts (e.g., N attempts) have not occurred, the process will continue to step 318, wherein a first communication protocol may be used to transport data. Additionally, if it is determined that the connection between the VDA client and the VDA server has failed due to a malfunction of the proxy, the server may be notified and only compression will be applied to the RDP stream. For example, image and data compression can be applied to the RDP stream that is transported using a first communication protocol, such as TCP. Subsequently the process will proceed back to step 312.

However, if in step 317 it is determined that N connection attempts have been made, the process can proceed to step 315, as described with respect to FIG. 3B, below.

Referring again to step 316, if it is determined that the token has been properly authenticated, the process then proceeds to step 320, wherein a second connection is established between the client device (e.g., client device 202) and the remote server (e.g., remote server 206). Additionally, the first connection between the client device and the remote server via the network gateway (e.g., the TSGW server) may be closed. In some aspects, the first connection can be closed in response to a notification from the client device (e.g., from the VDA client) that is sent to the server (e.g., the VDA server), instructing the server to close the first connection.

Once established, the second connection may be maintained via the proxy (e.g., the VDA proxy of the network gateway) and communication between the client device and the server may be conducted using a second communication protocol that is different from the first communication protocol. Although the second communication protocol may comprise any communication protocol that is different from that of the first, in some implementations the second communication protocol is UDP Plus.

Next, the process proceeds to step 322, wherein information received from the remote server using the second communication protocol is decompressed and/or decrypted. For example, data that is sent between the client device and the server can be bulk compressed and/or encrypted (e.g., using 128 bit Open SSL). In certain aspects, the second communication protocol may be used to transport RDP data. For example, RDP data from the RDP client can be compressed and/or encrypted by the VDA client and transported to the server using the UDP Plus protocol. Once received by the server, the data can be decompressed and/or decrypted back by the VDA server and then provided to the RDP server.

Similarly, RDP data sent from the RDP server can be compressed and/or encrypted by the VDA server before being transported to the client device using UDP Plus protocol. Subsequently, the data can be decompressed and/or decrypted by the VDA client, before being provided to the RDP client. In this manner, data can be transported between the client device and the server (e.g., over public and private networks) using an enhanced protocol (such as UDP Plus).

In step 324, the determination will be made as to whether the second connection should be closed/disconnected. If it is determined that the second connection should not be closed, the process proceeds to step 328, wherein it is determined if a signature verification packet has been received. If no signature packet has been received, then the process continues back to step 322, wherein the second connection is maintained and information received by the client device continues to be decompressed and/or decrypted based on the second communication protocol (e.g., UDP Plus).

Alternatively, if it is determined in step 328 that a signature verification packet has been received by the VDA client, then the process continues to step 330. In step 330 the client is validated by sending an encrypted signature back to the VDA server via the VDA proxy. In certain implementations, signature verification packet(s) may be periodically sent to the server in order to authenticate the client at regular intervals. In some implementations, if no signature verification packet(s) are received by the server, the client authentication fails, and the connection is terminated. Subsequently, the process proceeds to step 322.

Referring back to step 324, if it is determined that the second connection should be closed, the process can then proceed to step 326, wherein the remote server and the proxy (e.g., VDA proxy 210) are notified of the connection closure, and the second connection is closed.

Figure 3B:
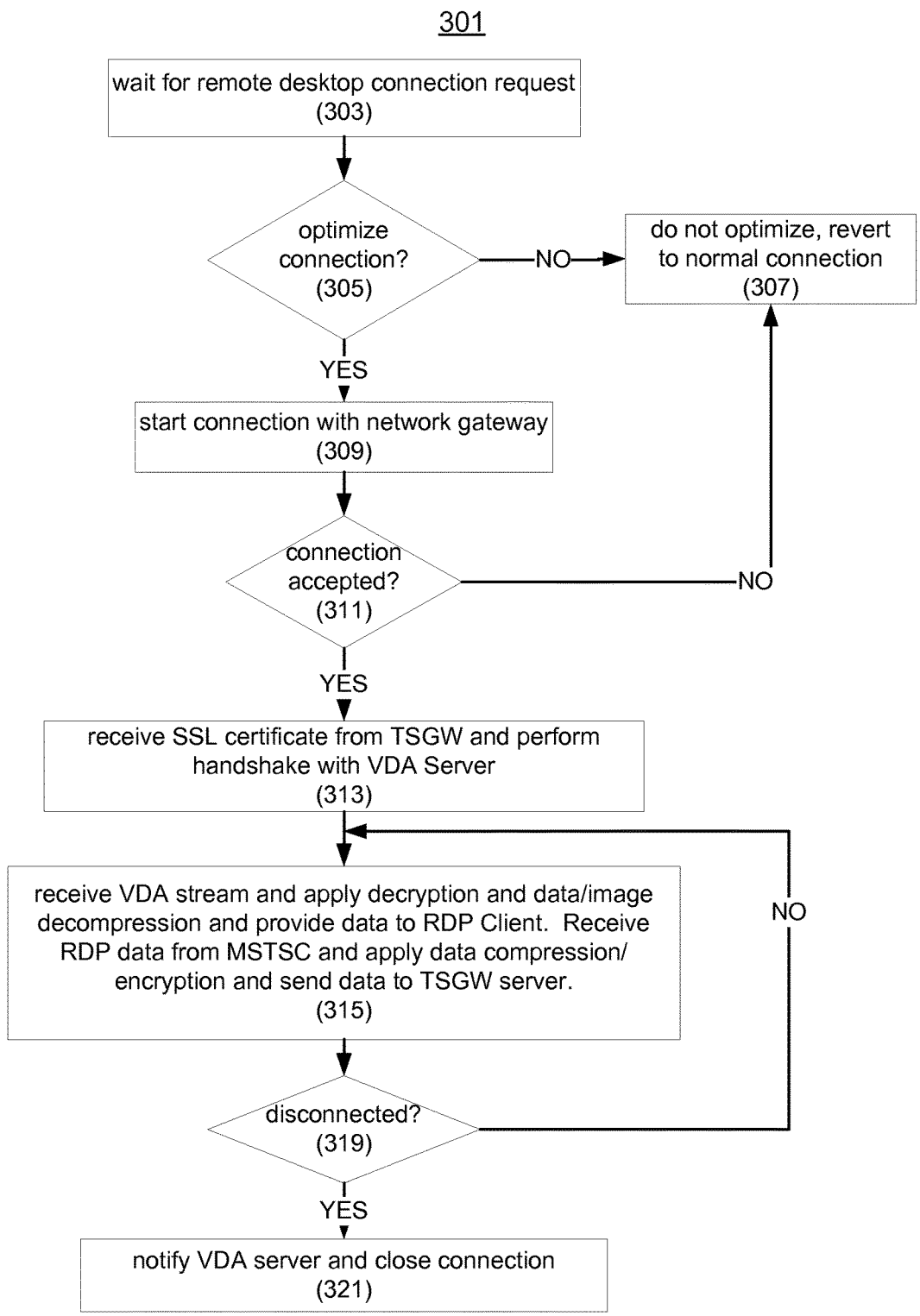

FIG. 3B illustrates an example method 301 of steps for establishing an accelerated remote desktop connection using a first communication protocol, wherein a SSL certificate is received by the client from a network gateway (e.g., from a TSGW server). The method 301 begins with step 303 in which the client (e.g., the VDA client 204) waits for a connection request, for example, coming from RDP client 104. VDA client 204 intercepts a connection request initiated by RDP client 104.

Subsequently, in step 305, it is determined whether the remote desktop session is to be bandwidth optimized, for example, by applying data and image compression, using a first communication protocol (e.g., TCP). If it is determined that the connection should not be optimized, the process proceeds to step 307, wherein the remote desktop session is not optimized, and is established and maintained using a first communication protocol, such as TCP.

Alternatively, if the determination is made to optimize the remote desktop session, the process proceeds to step 309, wherein an optimized connection request is made to the network gateway, for example, a network gateway including a TSGW server (e.g., TSGW server 110a).

Next, the process proceeds to step 311 where it is determined if the optimized connection request is accepted by the network gateway. If not, the process reverts back to step 307, wherein the connection is not optimized and a connection is established, and maintained, using a first communication protocol, such as TCP.

Alternatively, if in step 311 the connection is accepted, the process proceeds to step 313 wherein a SSL certificate is received from the network gateway (e.g., a TSGW server). Using the SSL certificate received from the network gateway, the client device may then proceed to perform a handshake with the VDA server.

Subsequently, in step 315, the client device (e.g., the VDA client) may receive a VDA stream from the VDA server. The received VDA stream can be decrypted and/or decompressed as necessary to provide unencrypted/uncompressed data to the RDP client.

The process may then proceed to step 319, wherein it will be determined if a signal has been received to disconnect the connection between the client and the server. If a disconnect signal is not received, the process will revert to step 315. However, upon receipt of a disconnect signal, the process will proceed to step 321, wherein the VDA server will be notified and the first connection between the VDA client and the VDA server will be closed.

Figure 4:
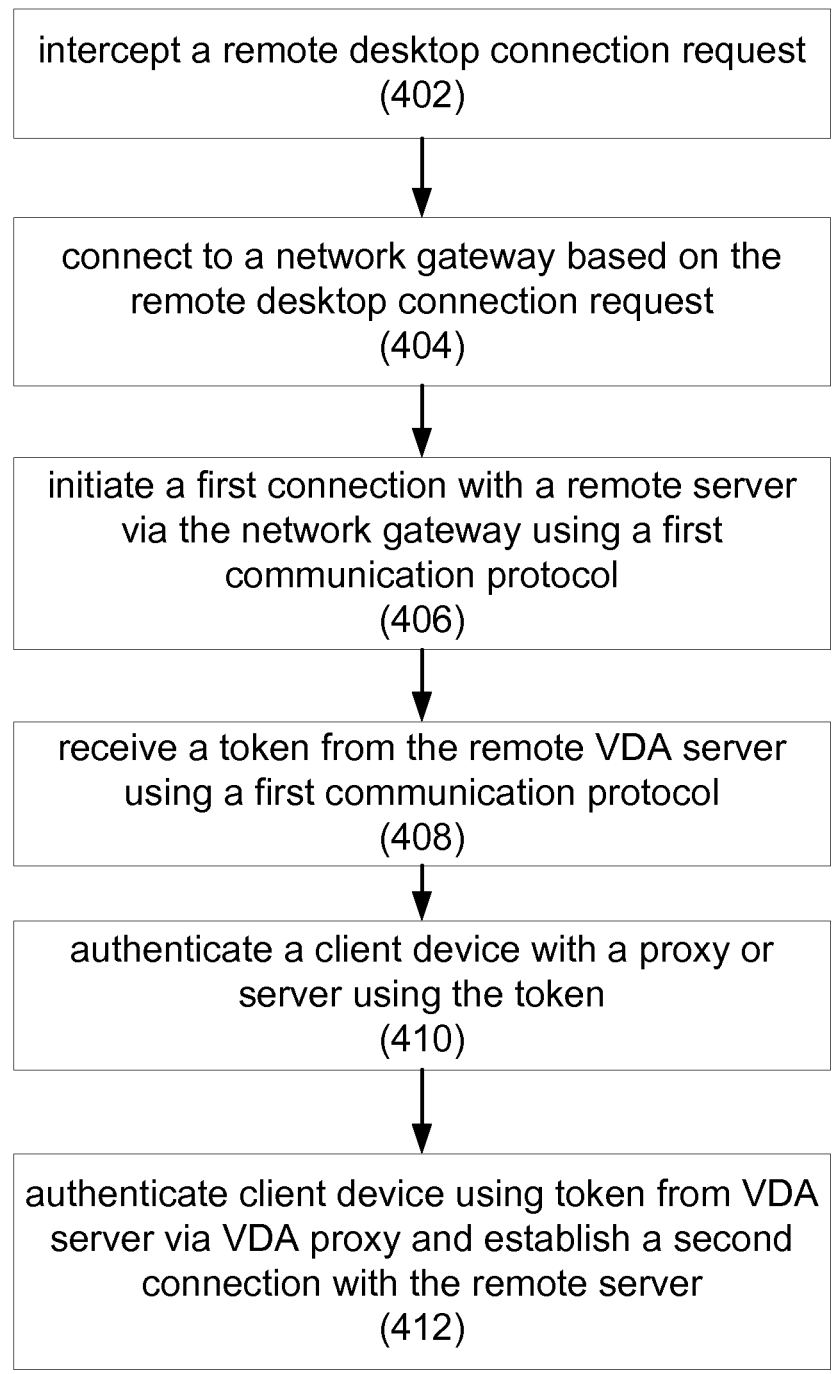
FIG. 4 illustrates an example method for establishing an accelerated remote desktop connection using a client device, according to certain aspects of the disclosure.

FIG. 4 illustrates an example method 400 for establishing an accelerated remote desktop connection using a client device. The method 400 begins with step 402 in which a remote desktop connection request is intercepted. The remote desktop connection request can be intercepted by a software module, such as a VDA client, on the client device. For example, referring to FIG. 2A, a remote desktop connection request can be issued by an RDP client (e.g., RDP client 104 running on client device 202). Subsequently, VDA client 204 can intercept the remote desktop connection request and facilitate the establishment of an accelerated connection to the remote server, as explained in further detail below.

In step 404, the client device is connected to a network gateway based on the remote desktop connection request. As discussed above, the client device can be connected to the network gateway (e.g., to TSGW sever 110a) using a first communication protocol. Furthermore, in certain aspects, the connection of the client device to the network gateway may require an authentication of the client device, for example, based on identification and authentication information provided by a user of the client device.

The TSGW server can perform the dual functions of authenticating the client device (e.g., a user of the client device), and mapping the first connection of the client device to a server within a private network. For example, one or more computing devices in a private network accessible by the TSGW server may share a pool of internet protocol (IP) address assignments. The TSGW server can be configured to track the current IP address of each computer in the network and to provide a mapping between names of the computers in the network and their respective current IP address. Thus, if provided with a server name, the TSGW server can direct an incoming remote desktop connection to the IP address of the intended server.

In step 406, a first connection is established with a remote server via the network gateway (e.g., via TSGW server 110a of the network gateway) using a first communication protocol. As discussed above, the first communication protocol can be TCP, which is used to transport RDP.

In step 408, a token is received by the client device, from the remote server, via the network gateway, e.g., via TSGW server 110a. The token can comprise various types of information, however in certain implementations the token may include information for identifying the remote server, such as, information that may be used to route the remote desktop connection to the remote server, as well as authentication information (e.g., a signature) that may be used to authenticate the client device.

In step 410, the client device is authenticated using the token. Authentication of the client device can be performed with the server, via the proxy (e.g., the VDA proxy). By way of example, the client device (e.g., the VDA client) can perform an authentication with the remote server using the token that was provided by the remote server (e.g., the VDA server). Although the token can include various types of data, in certain aspects the token may include a unique combination of alphanumeric values. In certain aspects, the token will be encrypted by the VDA client before it is received by the VDA server (e.g., VDA server 208) via the VDA proxy (e.g., VDA proxy 210a). Once received by the VDA server, the token will be decrypted and a second level of authentication will be performed, wherein it will be determined whether the token provided by the VDA client can be properly validated. The result of the authentication decision made by the VDA server will be provided to the VDA proxy, which will either allow or disallow the pending connection, based on the authentication decision.

Authentication between the client and the server will ensure that the connection can be moved to a second communication protocol via the VDA proxy. Once the client device has been properly authenticated with server (e.g., VDA server 208) the first connection may be closed.

In step 412, the client device establishes a second connection with the remote server, via the proxy, wherein the second connection is established using a second communication protocol (e.g., UDP Plus). The second connection between the client device and the remote server may be performed between the VDA client (e.g., VDA client 204 of client device 202) and a VDA server (e.g., VDA server 208 of remote server 206) via VDA proxy (e.g., VDA proxy of network gateway 210.

As discussed above, the proxy can comprise software modules that are running on the network gateway (e.g., VDA proxy 210a of network gateway 210). However, in other network configurations, the proxy can comprise hardware and/or software, distinct from network gateway 210. For example, the proxy can comprise another computing device, including software modules (e.g., VDA proxy 210a). Furthermore, the proxy may comprise a server or desktop computer (including software modules) that is distinct from the network gateway, which includes the TSGW server.

Figure 5A:
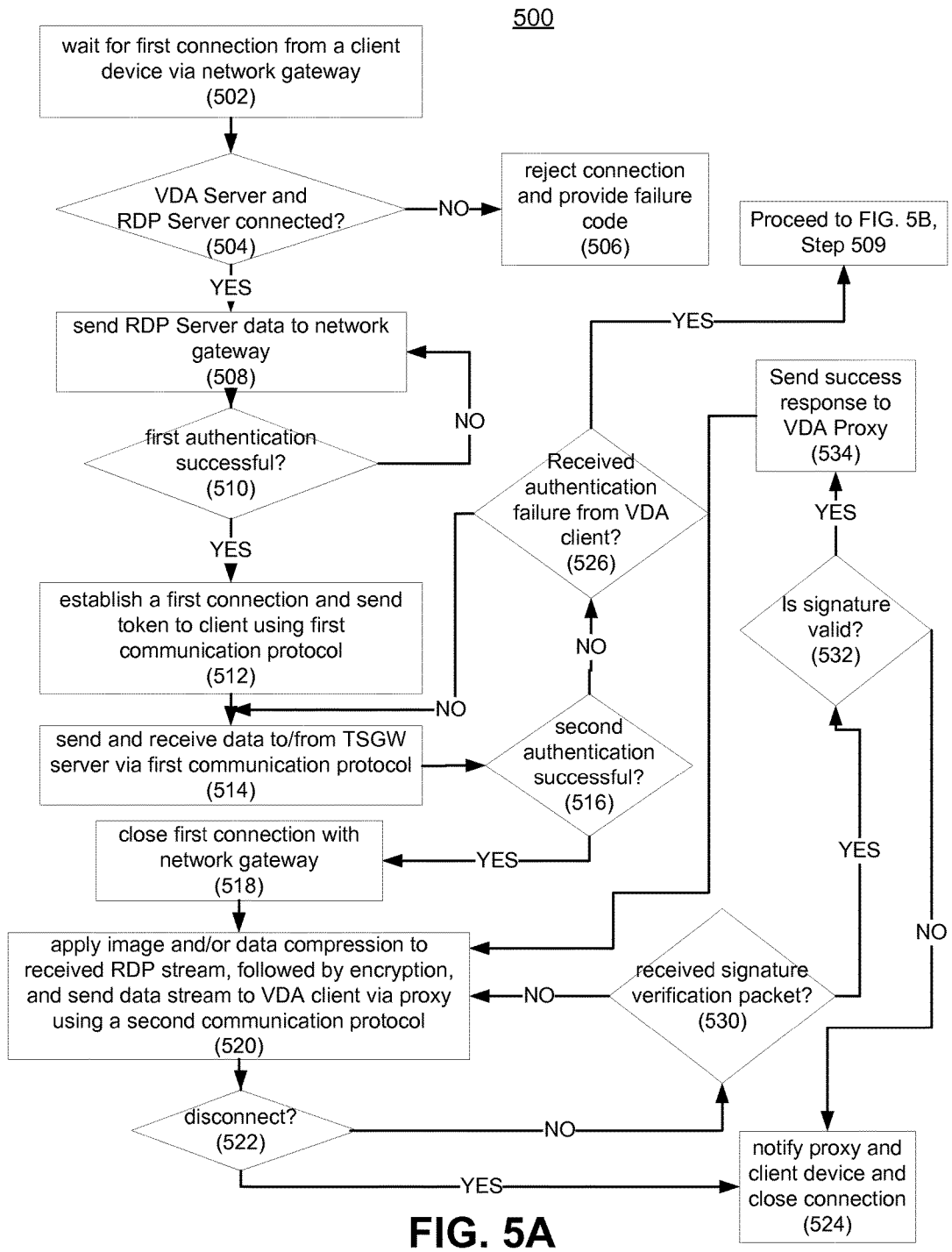
FIGS. 5A and 5B illustrate examples of processes for establishing an accelerated remote desktop connection using a server, according to certain aspects of the disclosure.

FIG. 5A illustrates an example of a flow diagram 500 of steps that may be performed by a server for establishing an accelerated remote desktop connection. Flow diagram 500 begins with step 502 in which the server (e.g., a VDA server) waits for a connection from a client device via a network gateway (e.g., a TSGW server). In certain aspects, the server actively listens for incoming connections from the network gateway.

Upon receiving a connection request (originating from the client device) via the TSGW server, the process proceeds to step 504 where it is determined whether the VDA server (e.g., VDA server 208 of remote server 206) is successfully connected with a RDP server (e.g., RDP server 108 of remote server 206). If it is determined that the VDA server and RDP server are unable to connect, the process proceeds to step 506, wherein the connection is rejected and a failure code is provided, for example, to the TSGW server of the network gateway.

However, if it is determined that the VDA server and RDP server were able to successfully connect, the process proceeds to step 508 in which the VDA server facilitates the forwarding of RDP server data to the network gateway, for communication with a client, such as, a RDP client of the client device. In certain aspects, the VDA server may append its own headers on data received from the RDP server and may provide an indication of packet type (e.g., signature, plain data, etc.) to the VDA client. Data may then be passed to the VDA client via the TSGW server.

Next, in step 510, the network gateway authenticates the client device in a first authentication step, for example, by verifying credentials that have been provided by the client device. If the client device cannot be properly authenticated, the process proceeds back to step 508. However, if the client device is properly authenticated, the process continues to step 512, in which a first connection is established between the server and the client device. The first connection can be established when a handshake is performed between the VDA client and the server (e.g., the VDA server), for example, wherein the VDA server appends VDA headers along with RDP PDUs to the data packets transmitted to the client device.

After the first connection is established, a token is sent to the client device via the network gateway, in step 512. In certain aspects, the token may be transmitted to the client device (e.g., the VDA client), from the server (e.g., the VDA server) via a secure tunnel of the network gateway, for example, within a secure tunnel provided by the (TSGW server).

After the client device has received the token, a second authentication may be performed wherein the client device is validated with the server in step 516. In some implementations, validation of the client device may be performed using a signature provided in the token. If it is determined that the second authentication is unsuccessful, the process proceeds to step 526, wherein the server will determine whether a permanent authentication failure notification has been received from the client using a first communication protocol. If an authentication failure notification has been received, the process will proceed to step 509 of FIG. 5B, as discussed below. However, if in step 526 it is determined that an authentication failure notification has not been received, the process proceeds back to step 514.

Alternatively, if in step 516 it is determined that the client device was properly authenticated (e.g. using the token) a second connection between the client device and the server is opened. Specifically, the server accepts a second connection, using a second communication protocol from the client device, via the proxy. Subsequently, the process may proceed to step 518 in which the first connection via the network gateway (e.g., via the TSGW server) is closed.

Next, in step 520, the second connection using the second communication protocol (e.g., UDP Plus) is used to transport data between the server and the client device via the proxy (e.g., the VDA proxy). As discussed above, the second communication protocol can be used to compress and/or encrypt data sent to the client device. In this regard, the VDA server may also be configured to decompress and/or decrypt data received from the client device via the VDA proxy.

For example, images sent from the server (e.g., in the RDP stream from the RDP server) may be compressed by the VDA server, for example, using a JPEG algorithm. Additionally, the VDA server can be configured to bulk compress the RDP stream, for example, using zlib compression. In certain aspects, the VDA server can be further configured to encrypt the RDP stream, for example, using SSL encryption, before the stream is transmitted to the VDA client via the VDA proxy. Once the encrypted and/or compressed RDP stream is received by the client device (e.g., by the VDA client), the stream may be decrypted and/or decompressed before being provided to the RDP client. By implementing encryption and/or compression, the accelerated remote desktop session can decrease the overall data transfer between the client and the server, thus improving the user experience.

In step 522, it is determined whether the second connection should be disconnected or closed. If it is determined that the second connection should not be disconnected, the process proceeds to step 530, wherein it is determined whether any verification packet(s) have been received. If validation packet(s) have not been received, the process proceeds back to step 520.

Alternatively, if verification packet(s) have been received at step 530, then the process proceeds to step 532, wherein the server can decrypt the verification packet(s) and validate a signature of the verification packet(s) to determine if the signature is valid. In step 532, if it is determined that the signature is valid then the process proceeds to step 534, wherein validation of the signature is reported to the VDA proxy. Subsequently, the process proceeds back to step 520, wherein the second connection will be upheld, for example, using the second communication protocol.

However, if in step 532 it is determined that the signature of the verification packet(s) is invalid, the process proceeds to step 524 in which a notification of the invalid signature is provided to the proxy and/or to the client device and the second connection is closed.

Figure 5B:
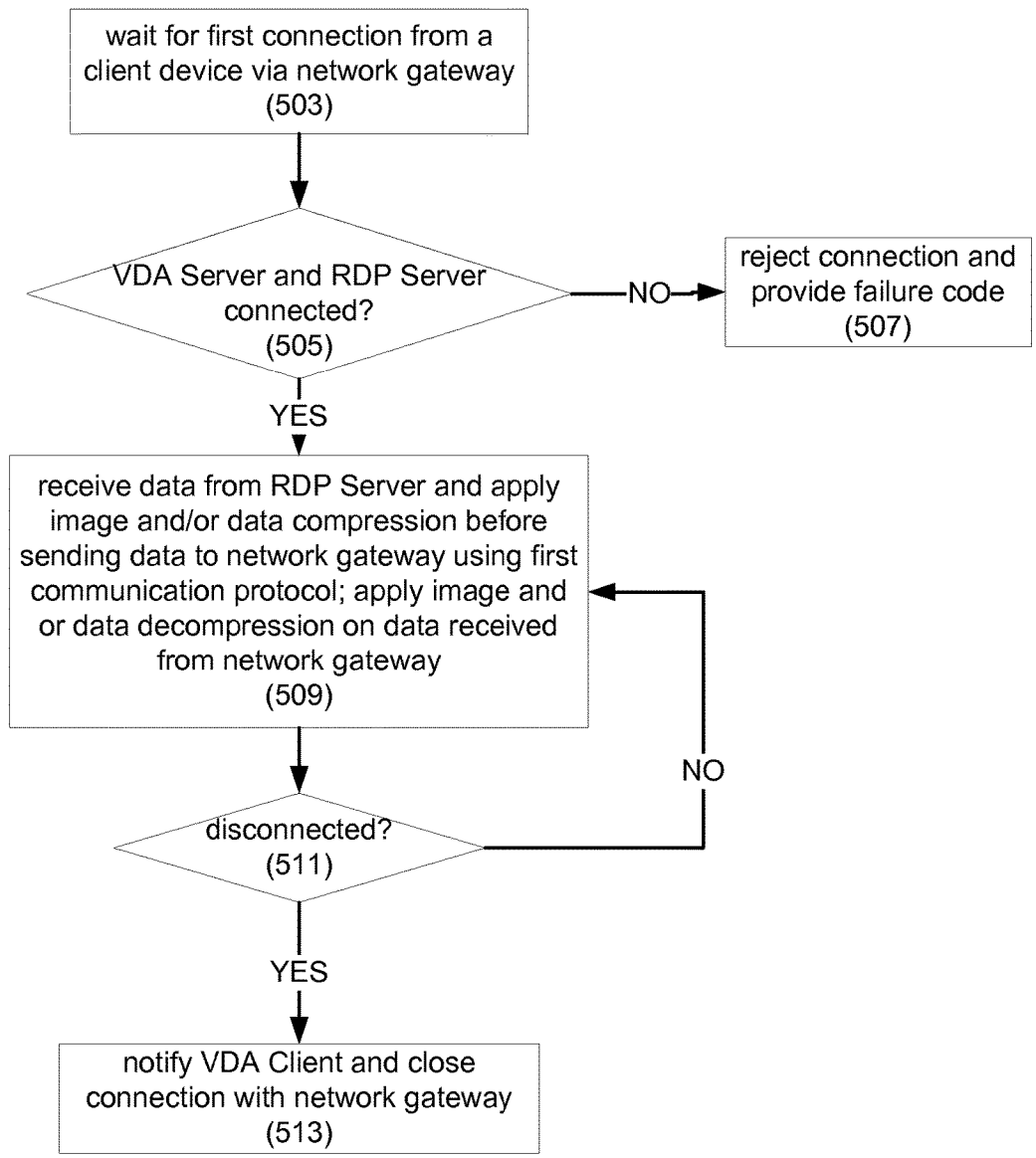

FIG. 5B illustrates an example of a flow diagram 501 of steps that can be performed by a server for establishing an optimized remote desktop connection. The process of flow diagram 501 begins with step 503 in which the VDA server waits for a connection from a client device via a network gateway. In certain aspects, the VDA server actively listens for incoming connections from the network gateway (i.e., the TSGW server).

Upon receiving a connection request, the process proceeds to step 505 where it is determined whether the VDA server (e.g., the VDA server 208 of remote server 206) is able to successfully connect with a RDP server (e.g., RDP server 108 of remote server 206). If it is determined that the VDA server and RDP server are unable to connect, the process proceeds to step 507, wherein the connection attempt is rejected and a failure code is provided, for example, to the TSGW server of the network gateway.

However, if it is determined that the VDA server and RDP server are able to successfully connect, the process proceeds to step 509 in which RDP server data is compressed and sent to the network gateway, for example, a TSGW server of the network gateway. In certain aspects, compressed RDP server data sent to the network gateway may be transported using a first communication protocol, such as TCP. For example, images sent from the server (e.g., in a RDP stream from the RDP server) may be compressed by the VDA server using a JPEG algorithm. Additionally, the VDA server may be configured to bulk compress the RDP stream, for example, using zlib compression. In certain aspects, the compressed RDP data can be transmitted to the VDA client via the network gateway (e.g., a TSGW server) using a first communication protocol, such as TCP. Similarly, received data may be decompressed and/or unzipped as necessary before the data is provided to the RDP server.

In certain aspects, before VDA data is transmitted, the network gateway server may encrypt the entire PDU. Once the encrypted and/or compressed RDP stream is received by the client device (e.g., the VDA client), the RDP stream may be decrypted and/or decompressed before being provided to the RDP client. By implementing encryption and/or compression, the accelerated remote desktop session can decrease the overall data transfer between the client and the server, thus improving the user experience.

The VDA server facilitates the forwarding of RDP server data to the network gateway, for communication with a client (e.g., a RDP client of a client device). In certain aspects, the VDA server may append its own headers on data received from the RDP server and may provide an indication of packet type (e.g., signature, plain data, etc.) to the VDA client. Data may then be passed to the VDA client via the TSGW server.

Subsequently, in step 511 it is determined whether a connection termination request has been received by the server. If no connection termination request is received, the process may revert to step 509. Alternatively, if a connection termination request is received, the process will proceed to step 513 in which the VDA client will be notified of the impending connection closure and the connection will be closed.

Figure 6:
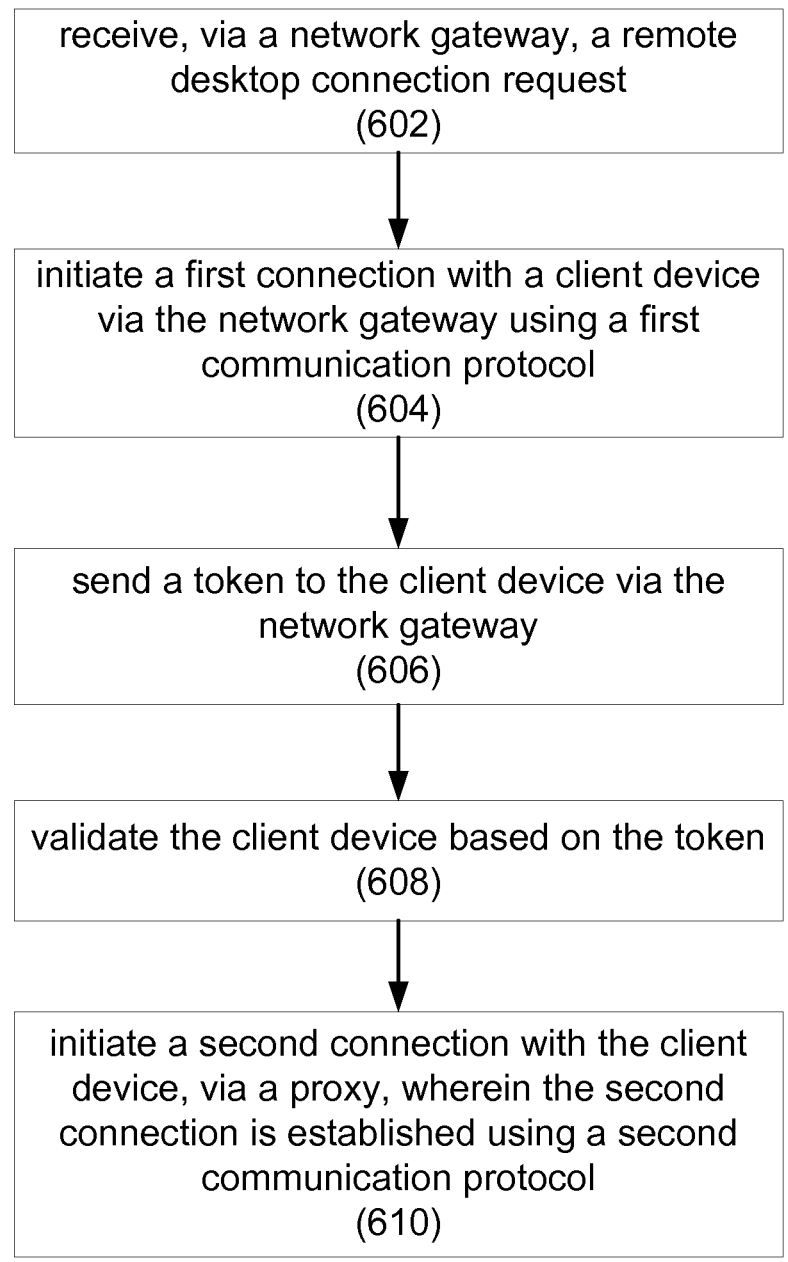
FIG. 6 illustrates an example method for establishing an accelerated remote desktop connection using a server, according to certain aspects of the disclosure.

An example method of steps that can be implemented by a server for use in establishing an accelerated remote desktop session is illustrated in FIG. 6. Specifically, FIG. 6 illustrates a method 600 that begins with step 602, wherein a remote desktop connection request is received via a network gateway. By way of example, the remote desktop connection request can be received via a TSGW server of the network gateway, as discussed above.

Subsequently, a first authentication occurs between the client device and the network gateway (e.g., the TSGW server). Depending on implementation, the first authentication may be performed between the client device and the server using identification and authentication information supplied by a user of the client device.

In step 604, a first connection is established with the client device via the network gateway using a first communication protocol (e.g., TCP). Next, in step 606 a token is sent by the server to the client device, via the network gateway. As discussed above, the token can be passed from the client device to the server via a secure tunnel of the of the network gateway, for example, via the TSGW server.

Although the token can comprise various types of information, in certain aspects the token can include identification and authentication information, for example to identify the server with which the client device will connect, as well as to provide a signature that can be used to authenticate the client device.

In step 608, the client device is validated based on the token (e.g., a signature of the token). In certain aspects, validation of the client device may be performed with a proxy (e.g., a proxy on the network gateway) as well as with the server, using a VDA server, as discussed above. After the client device has been validated, the first connection using the first communication protocol can be closed.

Additionally, after successful validation of the client device, a second connection is established in step 610. Specifically, in step 610 a second connection with the client device is established via a proxy (e.g., the VDA proxy of the network gateway), wherein the second connection is established using a second communication protocol. Although the second connection can be established using any communication protocol, in some implementations the protocol may comprise UDP Plus, which can improve reliability and employ encryption and/or data compression for data transferred between the client device and the server.

In many aspects, implementations of the client device and the server rely on a proxy, e.g., a VDA proxy, such as VDA proxy 210a. As noted above, the proxy can be integrated with the network gateway (e.g., as a software module installed on a computing device of the network gateway), or the proxy can be implemented separately, for example, as a server or a desktop computer that is connected to the private network (e.g., the private network 114). As discussed in reference to implementations of the client device and the server, the proxy can be used to establish and maintain a second connection between the client device and the server using a second communication protocol that is different from the first communication protocol.

Figure 7:
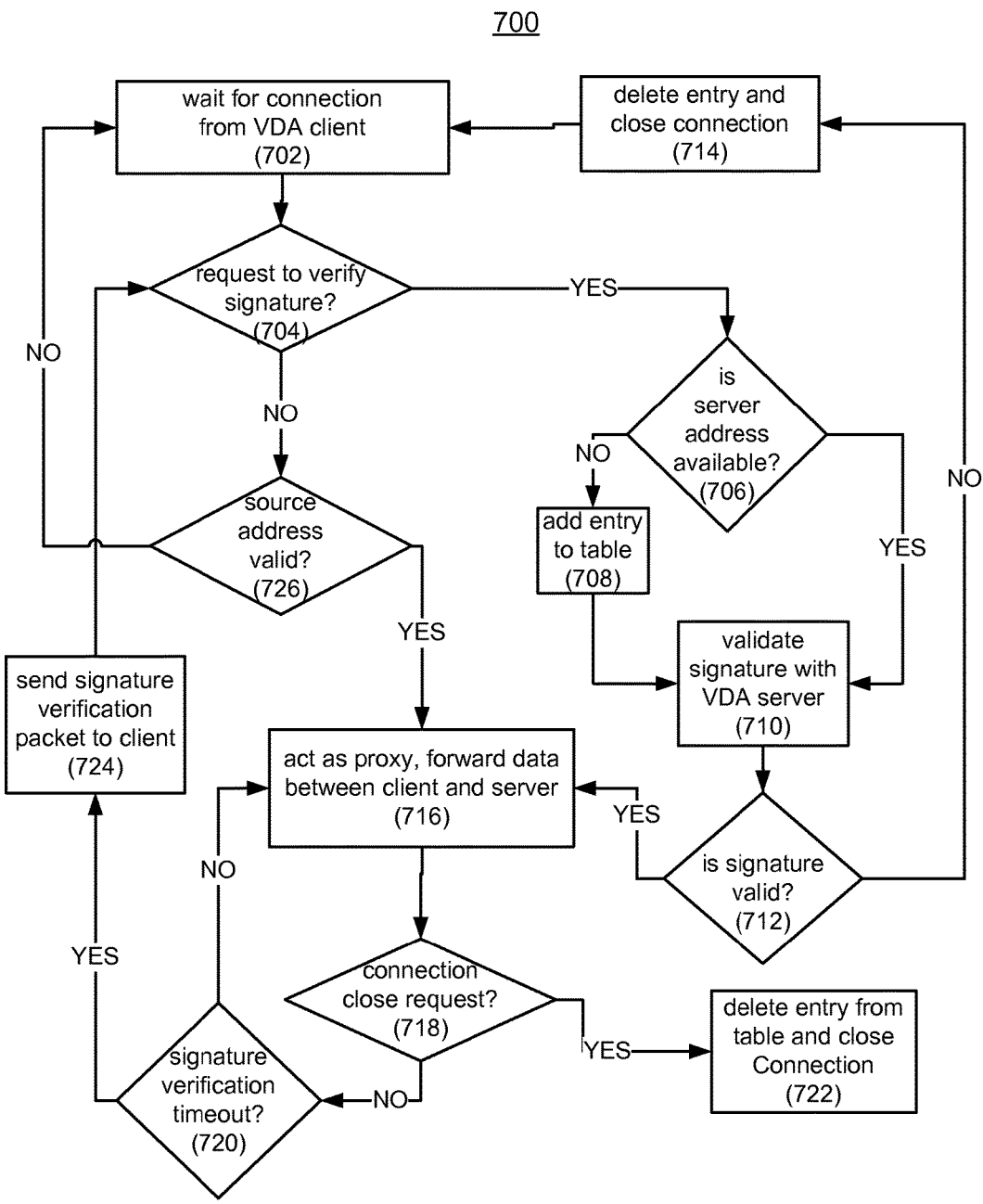
FIG. 7 illustrates an example of a flow diagram of steps for establishing an accelerated remote desktop connection using a proxy, according to certain aspects of the subject disclosure.

An example flow diagram for steps that can be implemented by the proxy for establishing an accelerated remote desktop session are illustrated in FIG. 7. Specifically, FIG. 7 illustrates an example of a flow diagram 700 of steps for establishing an accelerated remote desktop connection, for example, a second connection between a client device and a server using a proxy (e.g., a VDA proxy). In certain aspects, the second connection is established after a first connection (e.g., an un-accelerated connection) has already been established between the client device and the server.

The flow diagram 700 begins with step 702, in which the proxy waits for a connection from the client (e.g., a VDA client). In some implementations, the waiting performed by the proxy in step 702 is in anticipation of a request for a second connection from the client device to the server. The proxy can be configured to "listen" for a connection on one or more UDP ports, and to recognize the type of data that is transacted on open ports. Furthermore, the proxy can be configured to distinguish between communication protocols based on the data packets received from the client device. For example, the proxy can be configured to distinguish between UDP Plus data and signature verification data that is received from the client device.

In step 704, it is determined whether the incoming connection request includes a request to verify a signature. For example, it is determined whether the request contains a signature to authenticate the client, for example, to establish a second (accelerated) remote desktop connection. In certain implementations, the signature verification request may be used to determine if the client issuing the request has previously established as second connection.

If it is determined that the incoming connection request does not contain a request to verify a signature, the process proceeds to step 726, in which it is determined whether the source address provided in the connection request is valid. If the source address is determined to be invalid, the process proceeds back to step 702, in which the VDA proxy continues to wait for a valid connection request. If however the source address is valid, the process proceeds to step 716, in which the proxy forwards data between the client and the server.

Referring back to step 704, if it is determined that the incoming connection request does contain a request to verify a signature, the process proceeds to step 706, in which it is determined whether or not the requested server address is available, i.e., whether or not an address of the requested server already exists in a port forwarding table accessible by the proxy. If the server address is available, the process proceeds to step 710 in which the signature is validated with the VDA server. Alternatively, if the server address is unavailable, the process instead proceeds to step 708 in which an entry is added to a table (e.g., a port forwarding table) to indicate the address of the server before the signature is validated in step 710. In certain implementations, after validation of the signature, the VDA server forwards an indication to the proxy that the signature was properly validated. Subsequently the process proceeds to step 716 in which the proxy (e.g., the VDA proxy) forwards data between the VDA client and the VDA server.

In step 718, it is determined whether a connection close request has been received by the proxy. In some implementation a connection close request may be received from either the server or the client. For example, a user of the client may indicate a desire to close the connection, causing the client to transmit a connection close request to the proxy. Once a connection close request is received by the proxy, the process proceeds to step 722 in which the entry (corresponding with the current connection between the client and the server) is deleted from the table (i.e., a port forwarding table) and the connection is closed.

However, if no connection close request is received, the process proceeds to step 720 in which it is determined if the signature verification has timed out. If the signature verification has not timed out, the process loops back to step 716, in which data will continue to be forwarded between the client and the server. However, if the signature verification has timed out, the process proceeds to step 724, in which a signature verification packet is sent to the client. Next, the process will proceed back to step 704, in which it is again determined whether there is a renewed request to verify the signature.

Figure 8:
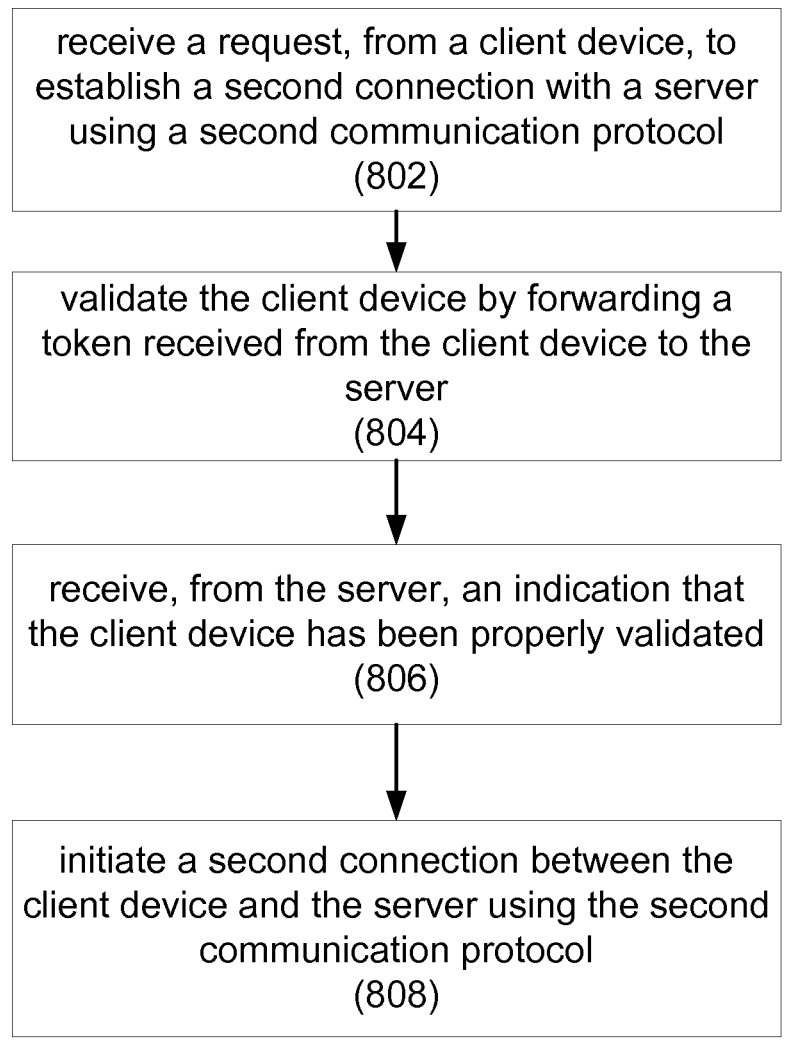
FIG. 8 illustrates an example method for establishing an accelerated remote desktop connection using a proxy, according to certain aspects of the disclosure.

FIG. 8 illustrates an example method 800 for establishing an accelerated remote desktop connection using a proxy. The method 800 begins with step 802 in which a request is received from a client device to establish a second connection with a server using a second communication protocol. In some implementations, the proxy waits and "listens" for the second connection request. For example, the proxy can be configured to listen for incoming connections on a UDP port and to recognize the type of data that is received (e.g., from a client device).

Once a client device has connected with the proxy, the method 800 proceeds to step 804 in which the client device is validated. Validation of the client device will require a passing of a token from the client device to the server (e.g. the VDA server) for authentication. For example, the VDA proxy will forward a token received from the VDA client to the VDA server. The VDA server will then determine if the token supplied by the VDA client can be properly validated.

In step 806, if the VDA server is able to validate the VDA client, the successful validation will be indicated to the VDA proxy, which will allow a connection between the client and the server.

Once the client device has been properly validated, method 800 can proceed to step 808. In step 808, a second connection between the client device and the server is initiated, using a second communication protocol. Although the second communication protocol can comprise any suitable communication protocol, in some implementations the second communication protocol may comprise UDP Plus. Once the second communication protocol is initiated, all of the traffic flowing between the client device and the server is transacted via the proxy (e.g., the VDA proxy of the network gateway) using the second communication protocol.

In step 808, a first connection between the client device and the server is closed. In some implementations, the first connection will have been upheld by the same network gateway on which the proxy resides, for example, on a TSGW server of the network gateway that is shared by the proxy (e.g., the VDA proxy component).

Figure 9:
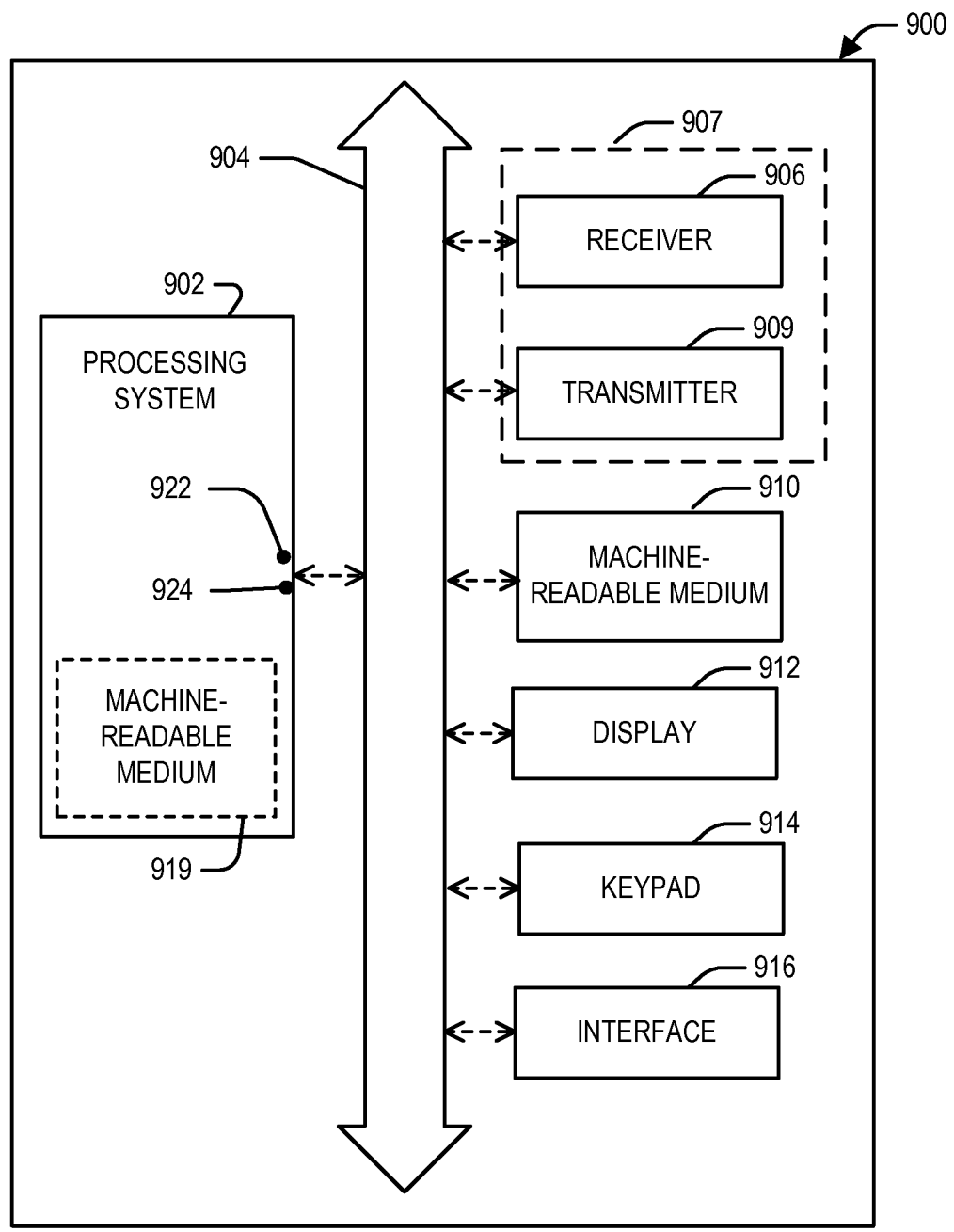
FIG. 9 is a block diagram illustrating an example computing system in accordance with certain embodiments of the present disclosure.

FIG. 9 is a conceptual block diagram illustrating an example of a system 900. The system 900 may be, for example, a client device, a proxy or a server. For example, system 900 could include the client device 202, the remote server 906 and/or the network gateway 210. As such, the system 900 may be used execute instruction or run software modules to facilitate the functioning of a VDA client (e.g., VDA client 204), a VDA proxy (e.g., the VDA proxy 210*a*) and/or a VDA server (e.g., the VDA server 208).

The system 900 includes a processing system 902. The processing system 902 is capable of communication with a receiver 906 and a transmitter 909 through a bus 904 or other structures or devices. It should be understood that communication means other than busses can be utilized with the disclosed configurations. The processing system 902 can generate audio, video, multimedia, and/or other types of data to be provided to the transmitter 909 for communication. In addition, audio, video, multimedia, and/or other types of data can be received at the receiver 906, and processed by the processing system 902.

The processing system 902 may include a general-purpose processor or a specific-purpose processor for executing instructions and may further include a machine-readable medium 919, such as a volatile or non-volatile memory, for storing data and/or instructions for software programs. The instructions, which may be stored in a machine-readable medium 910 and/or 919, may be executed by the processing system 902 to control and manage access to the various networks, as well as provide other communication and processing functions. The instructions may also include instructions executed by the processing system 902 for various user interface devices, such as a display 99 and a keypad 914. The processing system 902 may include an input port 922 and an output port 924. Each of the input port 922 and the output port 924 may include one or more ports. The input port 922 and the output port 924 may be the same port (e.g., a bi-directional port) or may be different ports.

The processing system 902 may be implemented using software, hardware, or a combination of both. By way of example, the processing system 102 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 919) may include storage integrated into a processing system, such as might be the case with an ASIC. Machine-readable media (e.g., 910) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 902. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client device or server or by a processing system of a client device or server. Instructions can be, for example, a computer program including code.

An interface 916 may be any type of interface and may reside between any of the components shown in FIG. 9. An interface 916 may also be, for example, an interface to the outside world (e.g., an Internet network interface). A transceiver block 907 may represent one or more transceivers, and each transceiver may include a receiver 906 and a transmitter 909. A functionality implemented in a processing system 902 may be implemented in a portion of a receiver 906, a portion of a transmitter 909, a portion of a machine-readable medium 910, a portion of a display 99, a portion of a keypad 914, or a portion of an interface 916, and vice versa.

Illustration of Machine Readable Storage Mediums/Systems/Methods for Facilitating an Accelerated Remote Desktop Session Using a Client Device (Described as Clauses)

Various examples of aspects of the disclosure are described as numbered clauses (1, 2, 3, etc.) for convenience. These are provided as examples, and do not limit the subject technology.

1. A machine-readable medium encoded with instructions executable by a processor to perform a method, the method comprising:
   intercepting a remote desktop connection request;
   connecting to a network gateway based on the remote desktop connection request;
   initiating a first connection with a server via the network gateway using a first communication protocol;
   receiving a token from the server;
   sending the token from a client device to the server or a proxy to authenticate the client device; and
   initiating a second connection with the server, via the proxy, wherein the second connection is initiated using a second communication protocol.

2. The machine-readable medium of any of the foregoing clauses, wherein initiating the first connection with the server further comprises:
   providing authentication credentials to authenticate the client device with the network gateway.

3. The machine-readable medium of any of the foregoing clauses, wherein the token comprises authentication information for authenticating the client device.

4. The machine-readable medium of any of the foregoing clauses, wherein authenticating the client device further comprises:
   authenticating the client device with the server using the token; and
   breaking the first connection with the server.

5. The machine-readable medium of any of the foregoing clauses, wherein initiating the second connection further comprises:
   performing an authentication with respect to the server using the token, and
   receiving a result of the authentication via the proxy.

6. The machine-readable medium of any of the foregoing clauses, wherein the first communication protocol is TCP.

7. The machine-readable medium of any of the foregoing clauses, wherein the second communication protocol is UDP Plus.

8. The machine-readable medium of any of the foregoing clauses, wherein the proxy is integrated with the network gateway.

In certain aspects, a computer-implemented method and client device are also provided utilizing the subject matter of any one of the foregoing clauses.

Illustration of Machine Readable Storage Mediums/Systems/Methods for Facilitating an Accelerated Remote Desktop Session Using a Server (Described as Clauses)

Various examples of aspects of the disclosure are described as numbered clauses (1, 2, 3, etc.) for convenience. These are provided as examples, and do not limit the subject technology.

9. A machine-readable medium encoded with instructions executable to perform a method, the method comprising:
   receiving, via a network gateway, a remote desktop connection request;
   initiating a first connection with a client device via the network gateway using a first communication protocol;
   sending a token to the client device via the network gateway; and
   initiating a second connection with the client device, via a proxy, wherein the second connection is established using a second communication protocol.

10. The machine-readable medium of any of the foregoing clauses, wherein the token comprises authentication information for authenticating the client device.

11. The machine-readable medium of any of the foregoing clauses, wherein the method further comprises:
    authenticating the client device using the token; and
    breaking the first connection with the client device.

12. The machine-readable medium of any of the foregoing clauses, wherein initiating the second connection further comprises:
    receiving the token from the client device via the proxy; and
    authenticating the token to verify the client device.

13. The machine-readable medium of any of the foregoing clauses, wherein the first communication protocol is TCP.
14. The machine-readable medium of any of the foregoing clauses, wherein the second communication protocol is UDP Plus.

In certain aspects, a computer-implemented method and server are also provided utilizing the subject matter of any one of the foregoing clauses.

Illustration of Machine Readable Storage Mediums/Systems/Methods for Facilitating an Accelerated Remote Desktop Session Using a Proxy (Described as Clauses)

Various examples of aspects of the disclosure are described as numbered clauses (1, 2, 3, etc.) for convenience. These are provided as examples, and do not limit the subject technology.

15. A machine-readable medium encoded with instructions executable to perform a method for facilitating a second connection between a client device and a server after a first connection has already been initiated between the client device and the server, the method comprising:
  receiving a request, from a client device, to initiate a second connection with a server using a second communication protocol;
  in response to the request, facilitating a validation of the client device by forwarding a token received from the client device to the server;
  receiving, from the server, an indication that the client device has been properly validated; and
  initiating the second connection between the client device and the server using the second communication protocol, based on the indication that the client device has been properly validated.
16. The machine-readable medium of any of the foregoing clauses, wherein the token received from the client device comprises one or more of, authentication information for the client device and identification information for the server.
17. The machine-readable medium of any of the foregoing clauses, wherein the second communication protocol is UDP Plus.
18. The machine-readable medium of any of the foregoing clauses, wherein initiating the second connection further comprises:
  initializing port forwarding from a UDP port of a proxy to a predetermined port of the server.
19. The machine-readable medium of any of the foregoing clauses, wherein the method further comprises:
  receiving a command, from the client device, to close the second connection;
  updating a table based on the command, wherein the table comprises data related to one or more remote desktop sessions; and
  closing the second connection in response to the command.

In certain aspects, a computer-implemented method and proxy are also provided utilizing the subject matter of any one of the foregoing clauses.

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow diagram, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow diagram can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof, where an instruction(s) may be software, an application(s), a subroutine(s), or a portion thereof, where the instructions(s) may be for performing the function(s) or operation(s). In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), a portion(s) or a combination(s) of any of the foregoing. Those skilled in the art will recognize how to implement the instructions, circuits, and processing systems.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), a portion(s) or a combination(s) of any of the foregoing. In one example, an item may also include a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. Those skilled in the art will recognize how to implement the instructions, circuits, and processing systems.

In one aspect of the disclosure, when actions or functions (e.g., receiving, determining, providing, generating, converting, displaying, notifying, accepting, selecting, controlling, transmitting, reporting, sending, or any other action or function) are described as being performed by an item (e.g., one or more of blocks, modules, elements, components or processors), it is understood that such actions or functions may be performed, for example, by the item directly. In another example, when an item is described as performing an action, the item may be understood to perform the action indirectly, for example, by facilitating, enabling or causing such an action. For example, determining can refer to facilitating determination, attaching can refer to facilitating attaching, and receiving can refer to facilitating receiving. In one aspect, performing an action may refer to performing a portion of the action (e.g., performing a beginning part of the action, performing an end part of the action, or performing a middle portion of the action).

A reference to an element in the singular is not intended to mean "one and only one" unless specifically so stated, but rather "one or more." For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known, or later come to be known to those of ordinary skill in the art are expressly incorporated herein by reference and are intended to be encompassed by the claims. Moreover, nothing disclosed herein is intended to be dedicated to the public regardless of whether such disclosure is explicitly not recited in the claims. No claim element is to be construed under the provisions of 35 U.S.C. § 19, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

What is claimed is:

1. A non-transitory machine-readable medium encoded with instructions executable to perform a method, the method comprising:
   receiving, via a network gateway, a remote desktop connection request;
   initiating a first connection between a client device and a remote server via the network gateway using a first communication protocol;
   sending a token to the client device via the network gateway;
   initiating a second connection between the client device and the remote server based on the token, via a proxy, wherein the second connection is established using a second communication protocol; and
   closing, by the remote server, the first connection with the client device.

2. The non-transitory machine-readable medium of claim 1, wherein the token comprises authentication information for authenticating the client device.

3. The non-transitory machine-readable medium of claim 1, wherein the method further comprises:
   authenticating the client device using the token.

4. The non-transitory machine-readable medium of claim 1,
   wherein initiating the second connection further comprises:
   receiving the token from the client device via the proxy; and
   authenticating the token to verify the client device.

5. The non-transitory machine-readable medium of claim 1,
   wherein the first communication protocol is transmission control protocol (TCP).

6. The non-transitory machine-readable medium of claim 1,
   wherein the second communication protocol is user datagram protocol (UDP) Plus.

7. A server configured to establish a remote connection with a client device, the server comprising:
   one or more hardware-based processors; and
   a non-transitory computer-readable medium comprising instructions stored therein, which when executed by the processors, cause the processors to perform operations comprising:
   receiving, via a network gateway, a remote desktop connection request;
   initiating a first connection between the client device and the remote server via the network gateway using a first communication protocol;
   sending a token to the client device via the network gateway;
   initiating a second connection between the client device and the remote server based on the token, via a proxy, wherein the second connection is initiated using a second communication protocol; and
   closing, by the remote server, the first connection with the client device.

8. The server of claim 7, wherein the token comprises authentication information for authenticating the client device.

9. The server of claim 7, wherein the operations further comprise:
   authenticating the client device using the token.

10. The server of claim 7, wherein initiating the second connection further comprises:
    receiving the token from the client device via the proxy; and
    authenticating the token to verify the client device.

11. The server of claim 7, wherein the first communication protocol is transmission control protocol (TCP).

12. The server of claim 7, wherein the second communication protocol is user datagram protocol (UDP) Plus.

13. A computer-implemented method for establishing a remote connection with a client device the method comprising:
    receiving, via a network gateway, a remote desktop connection request;
    initiating a first connection between the client device and the remote server via the network gateway using a first communication protocol;
    sending a token to the client device via the network gateway;
    initiating a second connection between the client device and the remote server based on the token, via a proxy, wherein the second connection is initiated using a second communication protocol; and
    closing, by the remote server, the first connection with the client device.

14. The computer-implemented method of claim 13, wherein the token comprises authentication information for authenticating the client device.

15. The computer-implemented method of claim 13, wherein the method further comprises:
    authenticating the client device using the token.

16. The computer-implemented method of claim 13, wherein initiating the second connection further comprises:
    receiving the token from the client device via the proxy;
    and authenticating the token to verify the client device.

17. The computer-implemented method of claim 13, wherein the first communication protocol is transmission control protocol (TCP).

18. The computer-implemented method of claim 13, wherein the second communication protocol is user datagram protocol (UDP) Plus.

* * * * *